United States Patent [19]

Masson et al.

[11] Patent Number: 5,213,734
[45] Date of Patent: May 25, 1993

[54] PROCESS FOR PRODUCING, BY BLOW MOULDING, HOLLOW BODIES MADE OF THERMOPLASTIC MATERIAL HAVING AN IMPROVED IMPERMEABILITY TO GASES

[75] Inventors: Didier Masson; Marc Obsomer, both of Brussels, Belgium

[73] Assignee: Solvay S.A., Brussels, Belgium

[21] Appl. No.: 833,654

[22] Filed: Feb. 12, 1992

[30] Foreign Application Priority Data

Feb. 20, 1991 [BE] Belgium ............... 09100167

[51] Int. Cl.⁵ .................. B29C 49/04; B29C 49/18; B29C 49/46
[52] U.S. Cl. .................. 264/83; 264/37; 264/85; 264/526; 264/529
[58] Field of Search .............. 264/83, 526, 528, 37, 264/529, 85

[56] References Cited

U.S. PATENT DOCUMENTS

| | | | |
|---|---|---|---|
| 3,862,284 | 1/1975 | Dixon et al. | 264/83 |
| 4,394,333 | 7/1983 | Fukushima et al. | 264/83 |
| 4,617,077 | 10/1986 | Giese et al. | 264/83 |
| 4,830,810 | 5/1989 | Ufer et al. | 264/83 |
| 4,869,859 | 9/1989 | Eschwey et al. | 264/83 |

FOREIGN PATENT DOCUMENTS

| | | |
|---|---|---|
| 0039929 | 11/1981 | European Pat. Off. |
| 0063378 | 10/1982 | European Pat. Off. |
| 0176044 | 4/1986 | European Pat. Off. |
| 0210344 | 2/1987 | European Pat. Off. |
| 0266439 | 5/1988 | European Pat. Off. |
| 3535602 | 10/1985 | Fed. Rep. of Germany ........ 264/83 |
| 3523137 | 4/1986 | Fed. Rep. of Germany ........ 264/83 |
| 61-230919 | 10/1986 | Japan ........................... 264/83 |

*Primary Examiner*—Jan H. Silbaugh
*Assistant Examiner*—Catherine Timm
*Attorney, Agent, or Firm*—Spencer, Frank & Schneider

[57] ABSTRACT

The process involves the following steps:
a. Expanding the blowing gas enclosed in the hollow body (VII) by opening the valve (8).
b. Injecting, into the hollow body, via the valve (4), a mixture of inert gas and reactive gas contained in the storage enclosure (II) and recovered from prior treatment.
c. Injecting, into the hollow body, an addition of reactive gas via the opening of the valve (6).
d. Maintaining the enriched mixture in the hollow body (VII).
e. Expanding this mixture contained in the hollow body and recovering the expanded mixture in the enclosures (IV) and (IV') via the valves (10), (14), (15), (16).
f. Recycling this mixture to the sealed storage enclosure (II) by the agency of the compressor (VI) with a view to a subsequent fluorination cycle.
g. Internal scavenging of the hollow body by nitrogen via the valve (1) and carrying away to a tower (VIII) for scrubbing and neutralising the residual reactive gas.

The process permits extensive recycling of the reactive gas, in particular of the fluorine, used for internally treating hollow bodies with a view to improving their impermeability.

12 Claims, 1 Drawing Sheet

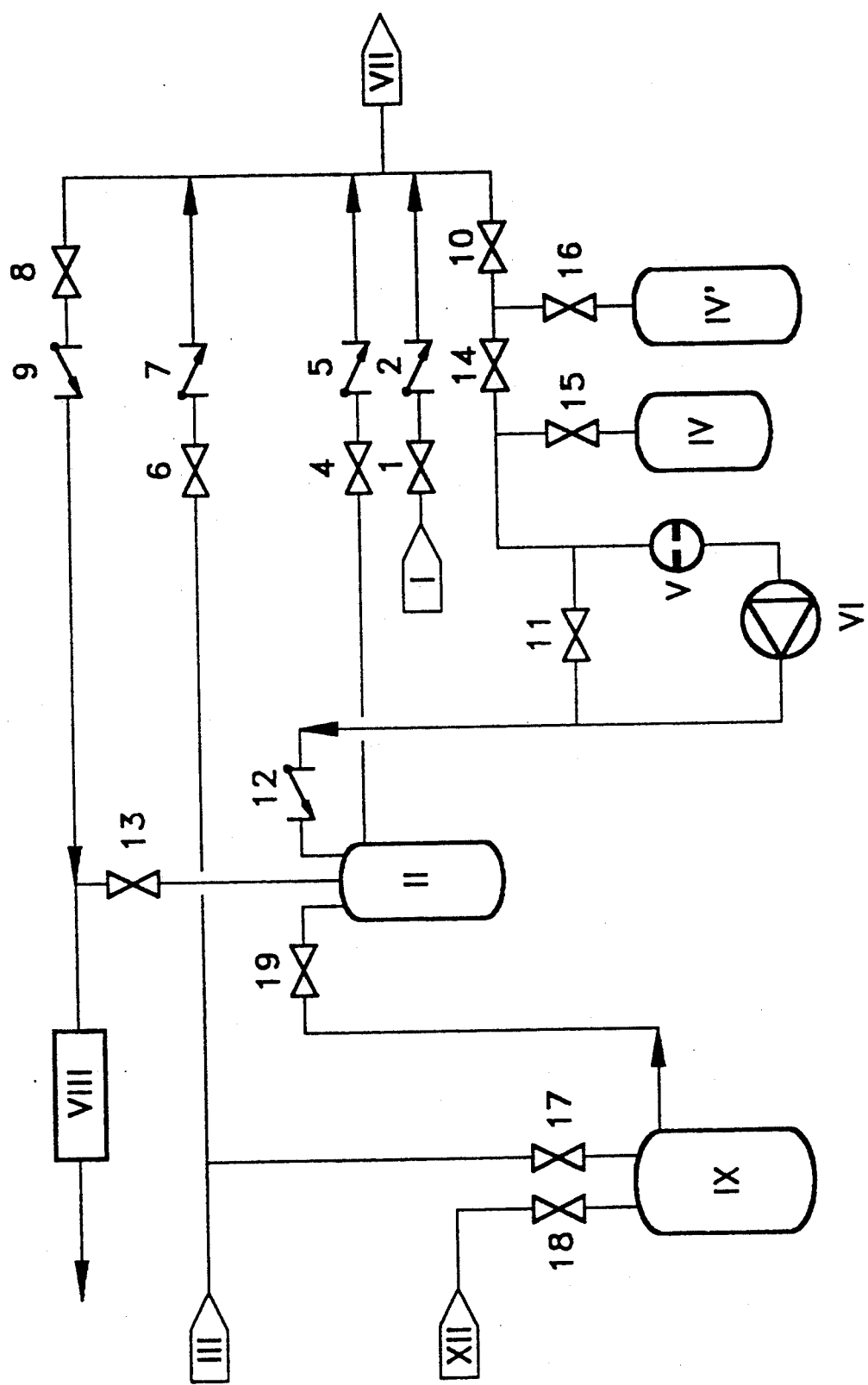

PROCESS FOR PRODUCING, BY BLOW MOULDING, HOLLOW BODIES MADE OF THERMOPLASTIC MATERIAL HAVING AN IMPROVED IMPERMEABILITY TO GASES

The present invention relates to a process for producing, by blow moulding, hollow bodies made of thermoplastic material, such as, especially, fuel tanks for motor vehicles, having an improved impermeability to gases.

Among the techniques which can be used for increasing the impermeability to gases of these types of hollow bodies made of thermoplastic material, that requiring a surface treatment by means of a reactive gas, such as fluorine especially, is currently widely used, in particular when these hollow bodies are produced from polyolefins, such as polyethylene especially.

The surface treatment by means of a reactive gas and especially by means of fluorine, may, however, turn out to be expensive on taking into account the cost of the reactive gas.

Thus, during a fluorination treatment, only a small portion of the fluorine introduced reacts with the surface of the article to be treated and the remainder is carried away by flushing with the blowing gases and becomes trapped and therefore lost, in a scrubber tower.

Moreover, the increasing stringency of the permeability standards imposed by users and the introduction of mixed fuels, containing oxygen-containing compounds such as methanol, require more and more energetic treatments involving especially a forced agitation of the treatment gas which is generally obtained by a succession of injections and of expansions of the treatment gas in the article to be treated. It goes without saying that recourse to this type of treatment leads to a significant increase in treatment gas losses.

Taking into account these considerations, a fluorination treatment process may therefore become economically advantageous only in so far as it can enable the reaction gas to be recovered and recycled as extensively as possible.

European Patent 0,039,929 already provides a process for fluorinating hollow bodies made of plastic materials which enables a certain recovery of the reaction gas. According to this process, the overhead of the reaction gas entrained by the inert flushing gas is recovered in an enclosure and reused during a subsequent fluorination cycle.

However, this process comprises the following limitations:
the inert flushing gas inevitably dilutes the reaction gas recovered and the yield of the recovery is thus limited, especially if the flushing is carried out with a continuous flow which leads to significant homogeneity defects of the mixture.
the consumption of reactive gas being proportional to the pressure of treatment, the non-recovered quantity always remains a fixed fraction of the quantity injected into the treated article.
in the case of recourse to a series of injection-expansion cycles, the process can, in practice, only carry out the recovery on the last cycle.

The object of the process according to the present invention is, consequently, to overcome these drawbacks and, furthermore, to provide numerous advantages which will be detailed in the description which will follow.

The invention relates, consequently, to a process for producing, by blow moulding, hollow bodies made of thermoplastic material having an improved impermeability to gases by treating their internal surface by a reactive gas such as fluorine, which process is characterised in that a cycle of successive operations is carried out which involves:
a) capturing a portion of an extruded parison of a thermoplastic material in a blowing mould,
b) injecting, into the captured preform, a pressurised mixture of inert gas and of reactive gas coming from a prior cycle stored in a pressurised enclosure, and this is done under a pressure permitting the moulding of the desired hollow body,
c) injecting, into the hollow body thus moulded, an addition of reactive gas in order to increase its content in the pressurised mixture,
d) maintaining the enriched mixture in the hollow body during a period of time sufficient for treating the internal wall of the moulded hollow body,
e) expanding the enriched mixture and recovering the latter in a sealed enclosure,
f) transferring the expanded gas mixture under compression from the sealed enclosure to the pressurised storage enclosure with a view to its use in step b of a subsequent production cycle,
g) injecting, into the hollow body, an inert scavenging gas which is carried away, it being possible for the operations f and g to be carried out simultaneously.

In general, the scavenging gas is preferably carried away to the atmosphere via an installation for neutralising the entrained residual reactive gas of the hollow body by the inert scavenging gas.

In the process according to the invention, the reactive gas employed is preferably fluorine.

In the process according to the invention, it becomes advantageous, in order to profit from the benefit of a series of injection-blowing cycles and of the resulting agitation, to repeat, at least once, between the operations e and g, the operations b, c, d, e and f, it being possible for the operations c and f to be omitted. In the case where this possibility offered by the process is used, the operation c, of injection of an addition of reactive gas, may be delayed and occur only during one or more of the successive injection-blowing cycles.

Furthermore, in the process according to the invention, it is permissable, between the operations a and b to proceed to the blow moulding of the hollow body by injection of a pressurised inert gas into the captured parison portion and, after this moulding, to proceed to the expansion and to the carrying away of the inert gas from the moulded hollow body. In this case, the remainder of the operations of the process according to the invention remain unchanged apart from the fact that, in the operation b, the pressurised mixture of inert gas and reactive gas is this time injected into the already moulded hollow body and therefore no longer participates in its moulding.

The injection of the inert scavenging gas may be carried out continuously or, preferably, by a series of compression-expansion cycles which enables the residual reactive gas to be even better diluted.

Finally, taking into account the fact that the presence of oxygen in the moulded hollow body impairs, in particular, the effectiveness of the treatment when the reactive gas used is fluorine, it may be advantageous during the extrusion of the parison to remove as far as possible the air contained in the latter by an internal scavenging by means of an inert gas.

The inert gas used in the various stages of the process according to the invention may be any inert gas, nitrogen generally being preferred for economic reasons.

The process according to the invention makes it possible to avoid a progressive dilution of the reactive gas in the recovered and recycled reactive mixture because, especially, the reactive gas consumed by a preceding treatment is compensated for during the next treatment by an addition, metered for this purpose, of reactive gas during the operation c.

Moreover, in the process according to the invention, the recycling of the reactive gas renders the consumption of non-effective reactive gas completely independent of the pressure imposed during the treatment and therefore permits a treatment at a higher pressure with the advantages of a better quality of the impermeabilisation treatment and a better dimensional quality of the finished hollow body.

Furthermore, in the process according to the invention, the already reduced consumption of non-effective reactive gas remains unchanged if a series of injection-expansion cycles is used and this is so except for the quantity of fluorine fixed onto the internal surface of the hollow body since this series of cycles is carried out in closed circuit and without any release. The process therefore permits an agitation of the reactive gas which leads to an increase in the effectiveness of the impermeabilisation treatment without any substantial increase in the material cost.

Finally, the reduction in the ineffective consumption of reactive gas also reduces the costs associated with the purification station before release to the atmosphere and participates in the protection of the environment.

The process according to the invention and the advantages which stem therefrom are, furthermore, explained in more detail in the description which will follow of a preferred embodiment and in which an installation represented diagrammatically in the single figure of the attached drawing is used.

This installation essentially comprises:

supply (I) of pure nitrogen controlled by a valve (1) and a shutter (2), a sealed storage enclosure (II) intended for containing a pressurised mixture of gaseous fluorine and nitrogen, recovered from a prior fluorination operation, and equipped with a valve (4) and a shutter (5), a supply (III) of high-concentration fluorine (5 to 100%) controlled by a valve (6) and a shutter (7), a carrying away to a scrubber tower (VIII), in communication with the atmosphere, and controlled by a valve (8) and by a shutter (9), a sealed recovery enclosure (IV) equipped with a valve (10), a second sealed recovery enclosure (IV') associated with valves (14), (15) and (16), this second enclosure and the associated valves being optional.

a filter (V) and a compressor (VI) equipped with a bypass (11) which can deliver under pressure the contents of the enclosures (IV) and (IV') to the sealed enclosure (II) via a valve (12).

The various components detailed hereinbefore are connected together via pipework and may be put into communication via the various valves and shutters, with the hollow body to be treated (VII) enclosed in its blowing mould (not shown).

EXAMPLE

By referring to the attached figure and by assuming that the hollow body to be treated by fluorination is already moulded and is enclosed in its mould, the fluorination treatment according to the process of the invention involves the following successive operations:

a. Expanding the blowing gas enclosed in the hollow body (VII) by opening the valve (8). Since the dilution of the fluorine subsequently introduced into the hollow body (VII) is influenced by the quantity of residual blowing gas contained in this hollow body, it is advised to carry out an expansion of the blowing gas which is as complete as possible and is compatible with maintaining the contact between the mould and the moulded article. Preferably, the expansion is conducted so that the pressure in the hollow body (VII) is between 1 and 2 bar and, preferably, between 1 and 1.2 bar.

b. Injecting, into the hollow body (VII), a mixture of nitrogen and fluorine contained in the sealed enclosure (II) and recovered from a prior fluorination treatment. This injection is obtained by opening the valve (4), the valve (8) being closed meanwhile.

c. Injecting, into the hollow body (VII), an addition of fluorine (determined so as to compensate for the fluorine consumption of the previous fluorination cycle), after closing the valve (8), this injection being obtained by temporarily opening the valve (6).

d. Maintaining the enriched mixture in the hollow body (VII) in order to fluorinate its internal wall.

e. Expanding the gaseous mixture contained in the hollow body (VII) by opening the valves (10), (14), (15) and (16), the expanded mixture being recovered in the sealed enclosures (IV) and (IV'). Since the gaseous mixture is expanded out of the hollow body instead of being flushed out, the concentrations of the inert gas and fluorine in the mixture are the same in the sealed enclosures as they were in the hollow body just after fluorination was completed.

f. Recycling the gaseous mixture by transferring the latter from the sealed enclosures (IV) and (IV') to the sealed storage enclosure (II) by the agency of the compressor (VI) and via the valve (12) and the filter (V). During this operation, the valve (10) may be closed.

g. Internal scavenging of the hollow body (VII) by nitrogen via the opening of the valve (1) and carrying away the residual gas extracted from the hollow body (VII) to the scrubber tower (VIII) by opening the valve (8). This scavenging is preferably carried out at the same time as the previous recycling operation.

In order to increase the effectiveness of the fluorination treatment, it is advantageous to carry out several successive fluorination cycles. For this purpose, after the aforementioned operation f and without proceeding to the operation g of scavenging, it is possible to proceed to one or several successive renewed injections of gaseous mixture into the hollow body (VII) followed by an expansion and a recovery according to the aforementioned points d, e and f. In this case, it is not necessary but it is possible to proceed to new intakes of fluorine into the gaseous treatment mixture since the latter circulates in closed circuit. It appears, consequently, that if a plurality of fluorination cycles is carried out, the fluorine consumption is reduced to the quantity of additional fluorine injected during the first treatment and which compensates, in fact, for the consumption of the fluorination cycle of the previously treated hollow body.

The second recovery enclosure (IV') present in the installation as illustrated has, in fact, the function of permitting an acceleration of the recovery phase which is, in fact, a step of little use for the fluorination and which adversely affects the rate of production (it appears in fact that the capacity of the compressor falls greatly when the suction pressure drops). The final recovery is performed in this particular case in three phases:
- the hollow body (VII) is placed in communication with the enclosure (IV) via the valves (10), (14) and (15), the valve (16) being closed (in this case the pressure which has reached equilibrium remains high as the enclosure (IV) could not be emptied sufficiently following the multiple recoveries),
- the hollow body (VII) alone is placed in communication with the inlet of the compressor by the valves (10) and (14), the valves (15) and (16) being closed, the suction pressure still ensuring a correct flow rate,
- when the pressure in the hollow body (VII) reaches a value such that the flow rate of the compressor becomes too low, the latter is placed in communication by the valves (10) and (16) with the second enclosure (IV') which is held at a low pressure during the entire fluorination.

In the process according to the invention, the fluorination treatment is carried out by the agency of a gaseous mixture recovered from a prior fluorination treatment and, consequently, the problem of starting up a fluorination treatment requires the pre-filling of the sealed storage enclosure (II) by means of a gaseous starting mixture. For this purpose, the installation such as represented in the figure of the attached drawing comprises, moreover, a sealed enclosure (IX) connected to nitrogen (III) and fluorine (XII) sources by valves (17) and (18) enabling an equilibrated mixture to be produced which may be transferred, during a start-up, into the sealed storage enclosure (II) via the valve (19). For safety reasons, the sealed storage enclosure (II) may, furthermore, be advantageously connected directly to the scrubber tower (VIII) via a valve (13). This valve (13) especially permits a rapid evacuation of the enclosures (IX) and (II), via the scrubber tower (VIII), if the need arises or in the event of exceeding the maximum pressure fixed for the enclosure (II).

The regulation of the process such as described may advantageously be controlled by time-delay, the pressure measurements serving, on the one hand, to regulate these time-delays for each type of hollow body to be treated and, on the other hand, to check the correct operation of the process.

As a variant of the process such as described, it is possible to envisage:
- blow moulding the desired hollow body by means of an inert gas containing a small proportion of reactive gas, this manner of proceeding having the advantage of exerting a progressive fluorination which protects the carbon-carbon bonds of the material constituting the treated hollow body against the exothermicity of the fluorination reaction.
- blow moulding the hollow body by means of an inert gas, then introducing reactive gas at low concentration (in order to limit the consumption and to obtain a progressive fluorination as indicated hereinabove) and expanding this gas towards the scrubber tower before introduction of the recycled reactive gas.

In the case where the blow moulding of the hollow body is obtained by the agency of an inert gas, this blow moulding may advantageously be carried out by a plurality of inert gas injection-expansion cycles. By proceeding in this manner, oxygen and oligomers possibly present in the starting parison are removed.

In the above description there was envisaged only the use of fluorine as reactive gas, but it is understood that the process, such as is claimed, remains applicable during a treatment by means of other reactive gases and, in particular, during a sulphonation treatment. Likewise, it is understood that the process, such as is described, may be applicable for any hollow body produced from any thermoplastic material.

We claim:

1. A process for producing, by blow moulding, blow moulded hollow bodies made of thermoplastic material having an improved impermeability to gases, comprising successive production cycles, each production cycle comprising steps for:
   a) capturing a portion of an extruded parison of the thermoplastic material in a blowing mould,
   b) injecting, into the captured portion of said extruded parison or into the blow moulded hollow body, a pressurised mixture of inert gas and of reactive gas,
   c) injecting, into the moulded hollow body, an addition of reactive gas in order to enrich the reactive gas content in the pressurised mixture,
   d) maintaining the enriched mixture in the hollow body during a period of time sufficient for treating an internal wall of the moulded hollow body to effect improved impermeability to gases,
   e) after treating, expanding the enriched mixture and recovering the expanded gas mixture in a sealed enclosure so that, through expansion and recovery, the concentrations of the inert gas and the reactive gas in the expanded gas mixture remain the same as the concentrations of the inert gas and the reactive gas in the enriched mixture within the body just after treating is completed.
   f) transferring the expanded gas mixture under compression from the sealed enclosure to a pressurised storage enclosure to use in step (b) of a subsequent production cycle, and
   g) after recovery of the expanded gas mixture in the sealed enclosure, injecting, into the hollow body, an inert scavenging gas.

2. The process according to claim 1, wherein the reactive gas is fluorine.

3. The process according to claim 1, wherein the inert scavenging gas carries away entrained residual reactive gas from the hollow body.

4. The process according to claim 1, wherein between steps (e) and (g), steps (b), (c), (d), (e) and (f) are repeated, at least once.

5. The process according to claim 1, including between steps (a) and (b), the blow moulding of the hollow body is carried out by injection of a pressurised inert gas into the captured parison portion and, after moulding, expanding the inert gas and carrying the expanded gas away from the hollow body so that in step (b) the pressurised mixture of inert gas and reactive gas is injected into the moulded hollow body.

6. The process according to claim 1, including prior to step (b) the air contained in the extruded parison is removed by an internal scavenging by an inert gas during production of said extruded parison.

7. The process according to claim 1, wherein the inert gas used is nitrogen.

8. The process according to claim 5 wherein the moulding of the hollow body is carried out by a plurality of inert gas injection-expansion cycles.

9. The process according to claim 1, wherein steps (f) and (g) are carried out simultaneously.

10. The process according to claim 1, wherein between steps (e) and (g), steps (b), (d), and (e) are repeated, at least once.

11. The process according to claim 1, including a step of blow moulding the hollow body between steps (a) and (b) wherein the blow moulding is carried out by injection, of a pressurised blowing gas mixture containing an inert gas and a small proportion of reactive gas, into the captured parison and, after moulding, expanding the pressurised blowing gas mixture and carrying the expanded blowing gas mixture away from the hollow body so that in step (b) the pressurised mixture of inert gas and reactive gas is injected into the moulded hollow body.

12. The process according to claim 1, wherein step (b) is performed to effect blow moulding of the hollow body.

* * * * *